United States Patent
Sim

(10) Patent No.: US 10,864,793 B2
(45) Date of Patent: Dec. 15, 2020

(54) ACTIVE ROLL STABILIZER

(71) Applicant: MANDO CORPORATION, Pyeongtaek-si (KR)

(72) Inventor: Gyung Hun Sim, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 248 days.

(21) Appl. No.: 15/935,703

(22) Filed: Mar. 26, 2018

(65) Prior Publication Data

US 2018/0272829 A1 Sep. 27, 2018

(30) Foreign Application Priority Data

Mar. 27, 2017 (KR) ......................... 10-2017-0038241

(51) Int. Cl.
B60G 21/055 (2006.01)

(52) U.S. Cl.
CPC .. B60G 21/0555 (2013.01); *B60G 2202/1351* (2013.01); *B60G 2202/42* (2013.01); *B60G 2204/62* (2013.01); *B60G 2400/32* (2013.01); *B60G 2400/98* (2013.01); *B60G 2600/21* (2013.01); *B60G 2800/012* (2013.01); *B60G 2800/9122* (2013.01)

(58) Field of Classification Search
CPC ............ B60G 21/0553; B60G 21/0555; B60G 2400/98; B60G 2202/135; B60G 2202/42; B60G 2800/012; B60G 2800/9122; B60G 2600/21; G01L 5/22; G01L 5/26

See application file for complete search history.

(56) References Cited

U.S. PATENT DOCUMENTS

| | | | | |
|---|---|---|---|---|
| 5,067,355 A * | 11/1991 | Witte | ...................... | G01L 3/109 73/112.01 |
| 5,849,120 A * | 12/1998 | Drieux | ............... | B60G 17/0161 152/416 |
| 9,452,657 B1 * | 9/2016 | Giaier | ...................... | B60Q 1/08 |
| 2005/0206100 A1 * | 9/2005 | Ohta | .................. | B60G 17/0162 280/5.511 |
| 2007/0040521 A1 * | 2/2007 | Yamada | ............. | B60G 17/0162 318/275 |
| 2008/0078253 A1 * | 4/2008 | Blackwood | ........... | G01L 3/1464 73/862.23 |
| 2011/0037239 A1 * | 2/2011 | Mori | .................. | B60G 21/0555 280/124.106 |
| 2014/0360285 A1 * | 12/2014 | Barraco | .................. | G01L 3/105 73/862.333 |
| 2017/0011566 A1 * | 1/2017 | Woo | ..................... | G07C 5/0808 |
| 2018/0105008 A1 * | 4/2018 | Zuscik | ................ | B60G 13/003 |

* cited by examiner

*Primary Examiner* — Frank B Vanaman
(74) *Attorney, Agent, or Firm* — Morgan, Lewis & Bockius LLP

(57) ABSTRACT

An active roll stabilizer includes a pair of stabilizer bars installed between left and right wheels of a vehicle and an actuator which connects the pair of stabilizer bars and transmits a rotational force to the pair of stabilizer bars, wherein the actuator includes a motor configured to generate the rotational force, a housing coupled to a portion between the pair of stabilizer bars and having the motor disposed inside the housing, a damping part disposed on an extension line of a rotational shaft of the motor inside the housing and configured to absorb vibrations generated at the motor and the pair of stabilizer bars, and a torque measurement sensing part configured to measure a torque transmitted by the rotational force inside the damping part.

9 Claims, 4 Drawing Sheets

ACTIVE ROLL STABILIZER

CROSS-REFERENCE TO RELATED APPLICATION

This application claims priority to and the benefit of Korean Patent Application No. 10-2017-0038241, filed on Mar. 27, 2017, the disclosure of which is incorporated herein by reference in its entirety.

BACKGROUND

1. Field of the Invention

The present invention relates to an active roll stabilizer.

2. Discussion of Related Art

An active roll stabilizer mounted on a vehicle is configured to control a roll moment of the vehicle and prevents a pull phenomenon generated by a centrifugal force while the vehicle is turning left or right or is traveling on a rough road surface, thereby enhancing driving stability of the vehicle and improving ride comfort of a driver when the driver is driving the vehicle.

The active roll stabilizer measures a torque of a stabilizer bar connected to wheels to control the roll moment.

Conventionally, the torque generated at the stabilizer bar may be measured using other torque sensors in addition to a strain gauge, but the other torque sensors are expensive, have a large size, and are not easy to install such that the torque is not easily measured.

Further, when the torque is measured using the strain gauge, an output value of the torque is varied according to a method of mounting the strain gauge and a mounting environment such that the torque may not be accurately measured, and since the strain gauge is mounted in a state of being exposed to the outside, durability of the strain gauge is degraded.

Meanwhile, in a structure for measuring the torque using the conventional strain gauge, an excessive force is applied to the strain gauge such that a sensible range of the strain gauge is out of a sensing range thereof, and increasing a size of a device on which the strain gauge is mounted in order to reduce the measured torque is impossible due to a design limitation.

Further, when the torque sensor is mounted on a coupler, the torque is not linearly measured due to slippage between a damper and a bearing and nonlinearity of the damper and thus an error may occur. In this case, even though the torque is not applied to a stabilizer bar, the torque is determined to be applied and thus accurate control may be difficult.

SUMMARY OF THE INVENTION

The present invention is directed to providing an active roll stabilizer capable of preventing a rotation over a predetermined rotational angle by accurately measuring a torque generated at a stabilizer bar and achieving stability of a vehicle by controlling a roll moment in a turning section and a rotating section of the vehicle.

According to an aspect of the present invention, there is provided an active roll stabilizer which includes a pair of stabilizer bars installed between left and right wheels of a vehicle, and an actuator which connects the pair of stabilizer bars and transmits a rotational force to the pair of stabilizer bars, wherein the actuator includes a motor configured to generate the rotational force, a housing coupled to a portion between the pair of stabilizer bars and having the motor disposed inside the housing, a damping part disposed on an extension line of a rotational shaft of the motor inside the housing and configured to absorb vibrations generated at the motor and the pair of stabilizer bars, and a torque measurement sensing part configured to measure a torque transmitted by the rotational force inside the damping part.

The damping part may include a coupler disposed on the extension line of the rotational shaft of the motor inside the housing and having one side supporting an inner surface of the housing, and a carrier having one side coupled to the other side of the coupler, the other side coupled to one of the pair of stabilizer bars, and an accommodation part formed at a central portion of the carrier, wherein the accommodation part may be an accommodation space in which the torque measurement sensing part may be mounted.

The carrier may include a carrier body formed in a cylindrical shape, and having one side provided with a coupling recess to which the other side of the coupler are coupled and the other side provided with the accommodation part in which the torque measurement sensing part is installed, and a connection member formed to protrude from the other side of the carrier body and coupled to at least one of the pair of stabilizer bars.

The damping part may be disposed between the carrier and the coupler, and may include a damper coupled to the coupler to cover a portion of an outer surface of the coupler and configured to absorb vibrations generated at the motor and the pair of stabilizer bars.

The carrier and the coupler may have central portions provided with a withdrawal hole through which a wire is withdrawn to be electrically connected to the torque measurement sensing part.

The torque measurement sensing part may include a sensor support member coaxially disposed on the extension line of the rotational shaft of the motor, and a torque measurement sensor installed on an outer circumferential surface of the sensor support member, and the sensor support member may include a sensor mounting part on which the torque measurement sensor is mounted, and a sensor fixing part formed at both ends of the sensor mounting part and having rigidity which is smaller than that of the sensor mounting part.

A thickness of the sensor fixing part may be smaller than that of the sensor support member.

A printed circuit board and the torque measurement sensor may be installed on an outer surface of the sensor mounting part.

The outer surface of the sensor mounting part may be provided with a flat surface or provided as a recess having a flat surface therein to allow the torque measurement sensor and the printed circuit board to be installed on the flat surface.

The damping part may include the coupler disposed on the extension line of the rotational shaft of the motor inside the housing, having one side supporting an inner surface of the housing, and having the torque measurement sensing part mounted inside the coupler, and the carrier having one side coupled to the other side of the coupler and the other side coupled to any one of the pair of stabilizer bars.

In accordance with the embodiments of the present invention, the active roll stabilizer can achieve stability of a vehicle by measuring torques of a pair of stabilizer bars connected to wheels and controlling a roll moment.

In accordance with the embodiments of the present invention, since a torque measurement sensing part is mounted inside a carrier such that the active roll stabilizer can measure a torque without slippage generated at a coupler and nonlinearity of a damper.

In accordance with the embodiments of the present invention, the active roll stabilizer can be installed using a separate bolt and the like since a small torque measurement sensing part is mounted inside the carrier and thus a magnitude of an actually applied torque becomes very small.

In accordance with the embodiments of the present invention, the torque measurement sensing part is press-inserted into the carrier to accurately measure the torques generated at the pair of stabilizer bars such that the active roll stabilizer can prevent a rotation over a predetermined rotational angle and achieve stability of the vehicle by controlling a roll moment in a turning section and a rotating section of the vehicle.

In accordance with the embodiments of the present invention, the strain gauge which is a torque measurement sensor is installed inside the carrier such that the active roll stabilizer can enhance durability and reliability of a strain gauge.

In accordance with the embodiments of the present invention, an installation part on which the strain gauge is mounted, and a torque transfer part have different rigidities and diameters such that the active roll stabilizer can reduce a torque transmitted to the strain gauge to prevent a sensible range of the strain gauge from being out of a sensing range.

Meanwhile, the active roll stabilizer according to the embodiments of the present invention can remove inconvenience of installing a separate sensor configured to measure the torques generated at the pair of stabilizer bars, reduce installation costs, and easily measure the torques.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
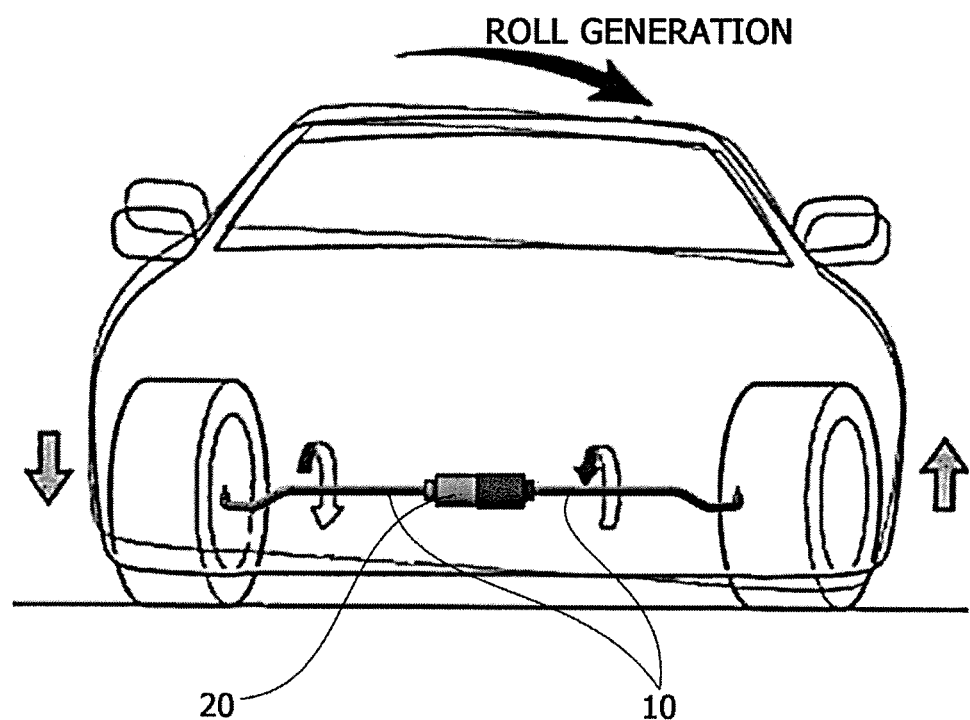
FIG. 1 is a schematic diagram illustrating a vehicle having an active roll stabilizer mounted therein according to one embodiment of the present invention.

Hereinafter, embodiments of the present invention will be fully described in detail which is suitable for easy implementation by those skilled in the art with reference to the accompanying drawings. The present invention may be implemented in various different forms, and thus it is not limited to the embodiments to be described herein. In the drawings, some portions not related to the description will be omitted in order to clearly describe the present invention, and the same reference numerals are given to the same or similar components throughout the present invention.

It should be understood that the terms of "include" and "have" specify the presence of stated herein features, numbers, steps, operations, components, elements, or a combination thereof, but do not preclude the presence or probability of addition of one or more another features, numbers, steps, operations, components, elements, or a combination thereof.

Figure 2:
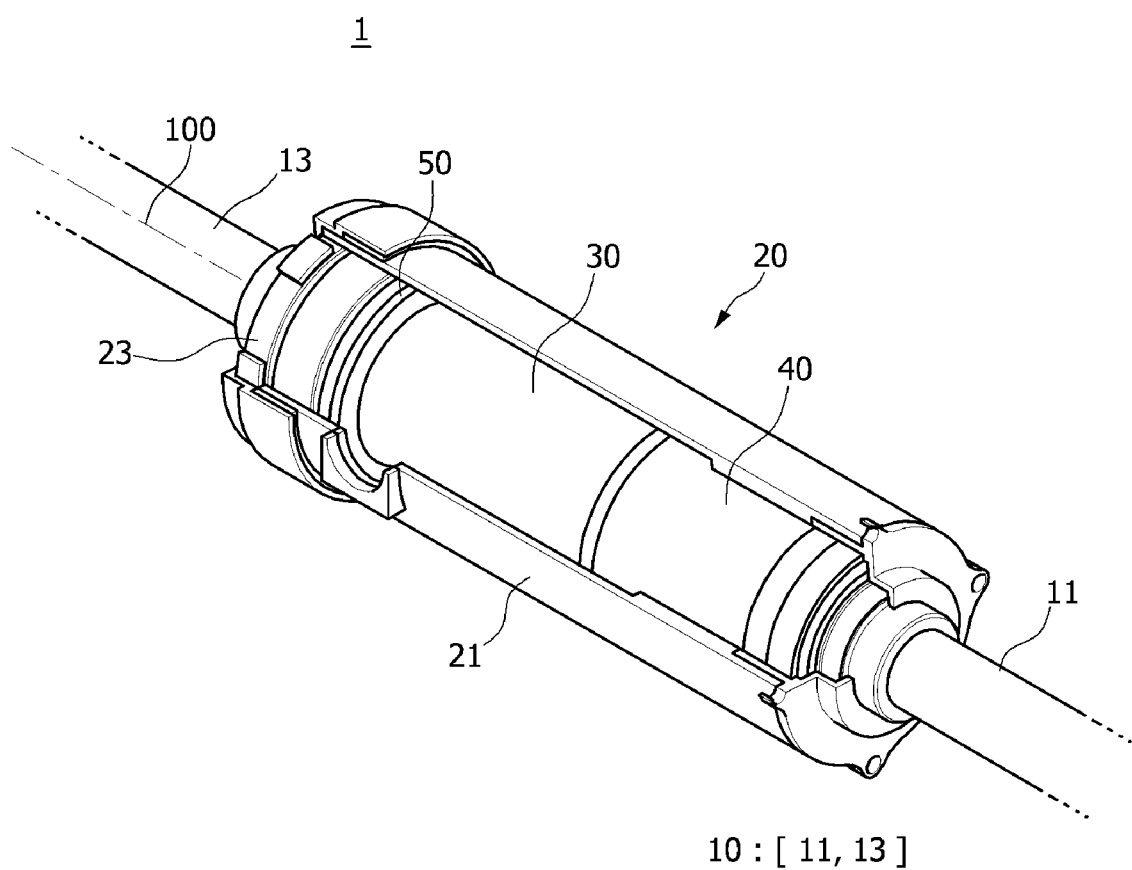
FIG. 2 is a perspective view of the active roll stabilizer according to one embodiment of the present invention.

FIG. 1 is a schematic diagram illustrating a vehicle having an active roll stabilizer mounted therein according to one embodiment of the present invention. FIG. 2 is a perspective view of the active roll stabilizer according to one embodiment of the present invention.

Hereinafter, referring to FIG. 2, a direction from a motor to a stabilizer bar will be defined and described as a forward direction and a direction from the stabilizer bar to the motor will be defined and described as a rearward direction.

Referring to FIGS. 1 and 2, an active roll stabilizer 1 according to one embodiment of the present invention may measure a torque of a stabilizer bar 10 using a sensor mounted without a separate installation mechanism and includes the stabilizer bar 10 and an actuator 20.

The active roll stabilizer 1 according to one embodiment of the present invention may measure torques of a pair of stabilizer bars 10 connected to wheels and control a roll moment, thereby achieving stability of the vehicle.

The active roll stabilizer 1 according to one embodiment of the present invention may be an electronic active roll stabilizer, but is not limited thereto. The active roll stabilizer 1 changes roll angles in a turning section and a rotating section of the vehicle to achieve the stability of the vehicle.

Referring to FIGS. 1 and 2, in one embodiment of the present invention, one ends of the pair of stabilizer bars 10 may be installed at left and right wheels of the vehicle, and the other ends thereof may be coupled to both sides of the actuator 20. Further, the pair of stabilizer bars 10 control a roll behavior of the vehicle while the vehicle is traveling and receive a rotational force from a motor 30 when the motor 30 is driven.

The active roll stabilizer 1 according to one embodiment of the present invention may control a posture of the vehicle by controlling torsional moments of the pair of stabilizer bars 10 through the actuator 20 connected to the pair of stabilizer bars 10.

Referring to FIG. 2, in one embodiment of the present invention, the pair of stabilizer bars 10 may include a first stabilizer bar 11 and a second stabilizer bar 13. At this point, the first stabilizer bar 11 and the second stabilizer bar 13 are rotatably coupled to both ends of a housing 21 on an extension line of a rotational shaft of the motor 30.

As shown in FIG. 2, the first stabilizer bar 11 is coupled to one end of the housing 21, e.g., a front end of the housing 21, and the second stabilizer bar 13 is connected to the other end of the housing 21, e.g., a rear end of the housing 21.

Referring to FIG. 2, in one embodiment of the present invention, the actuator 20 may include the housing 21, the motor 30, a planetary gear 40, a damping part 50, and a torque measurement sensing part 70 so as to control the torsional moments of the pair of stabilizer bars 10.

Referring to FIG. 2, in one embodiment of the present invention, the housing 21 may be in a cylindrical shape and a hollow may be formed in the housing 21 to allow the motor 30, the planetary gear 40, the damping part 50, and the torque measurement sensing part 70 to be positioned inside the housing 21.

Further, in one embodiment of the present invention, the motor 30 may be fixed inside the housing 21, and when the motor 30 is driven in a state of being fixed inside the housing 21, a torsional moment may be generated at the housing 21. Torques generated at the pair of stabilizer bars 10 may be measured on the basis of the torsional moment generated as described above.

Figure 3:
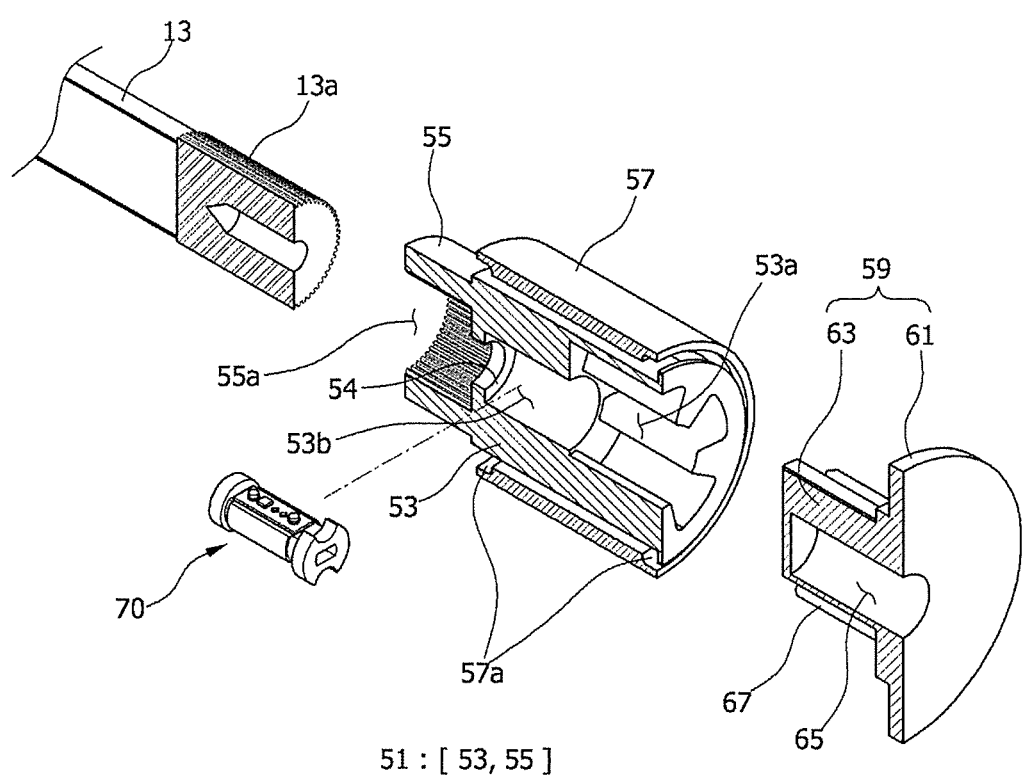
FIG. 3 is a perspective view illustrating a damping part on which a torque measurement sensing part of the active roll stabilizer is mounted and a stabilizer bar according to one embodiment of the present invention.
Figure 4:
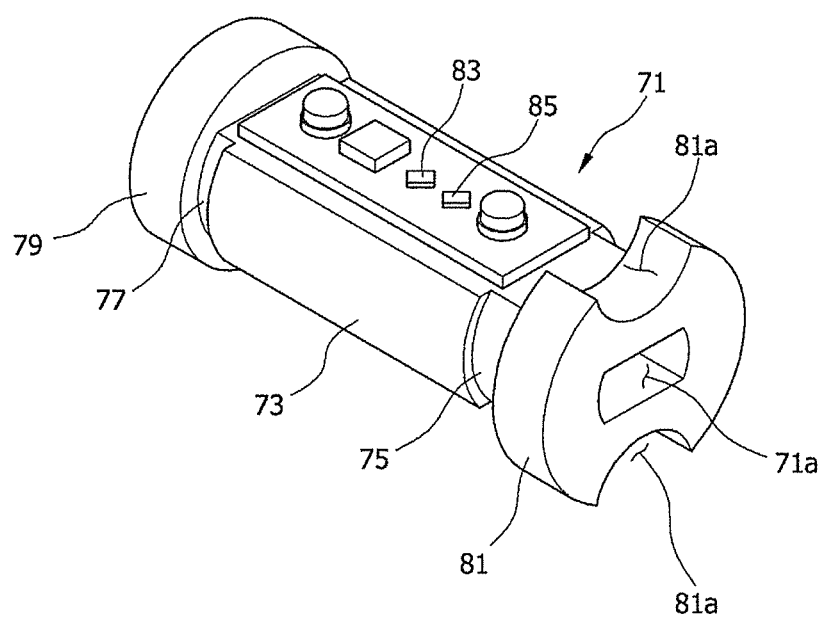
FIG. 4 is a perspective view of the torque measurement sensing part of the active roll stabilizer according to one embodiment of the present invention.

FIG. 3 is a perspective view illustrating the damping part 50 on which a torque measurement sensing part 70 of the active roll stabilizer 1 is mounted and the second stabilizer bar 13 according to one embodiment of the present invention. FIG. 4 is a perspective view of the torque measurement sensing part 70 of the active roll stabilizer 1 according to one embodiment of the present invention.

Referring to FIG. 3, in one embodiment of the present invention, a fixing member 23 may be in a cylindrical shape and be fixed inside the housing 21, thereby fixing the damping part 50 and the torque measurement sensing part 70 inside the housing 21.

Further, in one embodiment of the present invention, the fixing member 23 may be made of an elastic material and may absorb vibrations generated when the motor 30 is driven and the pair of stabilizer bars 10 are operated. At this point, a bearing member 57 may be installed between the damping part 50 and the fixing member 23.

Meanwhile, referring to FIG. 2, in one embodiment of the present invention, the motor 30 may include a stator (not shown) for generating a magnetic force when power is applied, and a rotor (not shown) which is rotated by the magnetic force generated by the stator.

At this point, in one embodiment of the present invention, the motor 30 may be driven by being positioned at one side of an interior of the housing 21, e.g., between the planetary gear 40 and the damping part 50 as shown in FIG. 2. That is, in one embodiment of the present invention, the motor 30 may be connected to the planetary gear 40 in front thereof and the damping part 50 may be positioned behind the motor 30.

Referring to FIG. 2, the planetary gear 40 may be positioned inside the housing 21 and may include a sun gear (not shown) and a planetary gear (not shown). Further, the planetary gear 40 may provide the rotational force of the motor 30 to the first stabilizer bar 11 between the motor 30 and the first stabilizer bar 11. At this point, the planetary gear 40 may include a reduction gear (not shown) having a gear ratio which increases as the number of gear stages increases.

Referring to FIG. 3, in one embodiment of the present invention, the damping part 50 may include a carrier 51, a coupler 59, and a damper 67. Further, in one embodiment of the present invention, the torque measurement sensing part 70 may be mounted inside the damping part 50.

In one embodiment of the present invention, the damping part 50 is positioned at the other side of the interior of the housing 21, e.g., between the motor 30 and the second stabilizer bar 13 at a rear side of the housing 21 as shown in FIG. 2.

Meanwhile, the damping part 50 is spaced apart from the motor 30 in the rearward direction such that the second stabilizer bar 13 is distorted to absorb vibrations caused by torsion generated when the rotational forces generated from the motor 30 and the planetary gear 40 are supplied to the first stabilizer bar 11.

Referring to FIG. 3, in one embodiment of the present invention, the carrier 51 may be rotatably supported inside the housing 21 and may include a carrier body 53 and a connection member 55.

Meanwhile, in one embodiment of the present invention, the carrier body 53 may be in a cylindrical shape which is rotatable in one direction, and a coupling recess 53a may be formed at one side of the carrier body 53, e.g., in a front portion thereof as shown in FIG. 3.

Further, in one embodiment of the present invention, an accommodation part 53b, which is an accommodation space in which the torque measurement sensing part 70 may be mounted, may be formed in a rear portion of the carrier body 53.

Since the torque measurement sensing part 70 is mounted inside the carrier 51, the active roll stabilizer 1 according to one embodiment of the present invention may measure a torque without slippage generated at the coupler 59 and nonlinearity of the damper 67.

Since the small torque measurement sensing part 70 is mounted inside the carrier 51, a magnitude of an actually applied torque becomes very small, and thus the active roll stabilizer 1 according to one embodiment of the present invention may be installed using a separate bolt and the like.

At this point, in one embodiment of the present invention, the accommodation part 53b may be positioned between the connection member 55 and the front portion of the carrier body 53 to which the coupler 59 is coupled.

Referring to FIG. 3, in one embodiment of the present invention, the accommodation part 53b may be formed in a hole shape having a circular cross section formed at a central portion of the coupling recess 53a of the carrier body 53.

At this point, a diameter of the accommodation part 53b may be smaller than that of the coupling recess 53a of the carrier body 53. Further, a hook bump member 54 may be formed to protrude inward from a rear end of the accommodation part 53b to allow the torque measurement sensing part 70 to be fixed.

Referring to FIG. 3, the carrier body 53 may be positioned inside the fixing member 23, and the bearing member 57 may be provided between the carrier body 53 and the fixing member 23. At this point, the carrier body 53 may be rotatably fixed inside the housing 21 by the bearing member 57 without vertical motion.

Meanwhile, in one embodiment of the present invention, the bearing member 57 may be in a cylindrical shape, and a ball bearing may be mounted between the carrier body 53 and the bearing member 57. At this point, an installation recess 57a may be formed at an inner circumferential surface of each of front and rear ends of the bearing member 57 so as to allow the ball bearing to be mounted between carrier body 53 and the bearing member 57.

Referring to FIG. 3, in one embodiment of the present invention, the installation recess 57a is formed to extend in an inner circumferential direction at the inner circumferential surface of the bearing member 57 such that a plurality of ball bearings may be mounted between an outer surface of the carrier body 53 and the installation recess 57a.

Referring to FIG. 3, in one embodiment of the present invention, the carrier 51 may include the connection member 55 of a cylindrical shape extending rearward from the carrier body 53. At this point, a first corresponding coupler 55a may be formed at an inner circumferential surface of the connection member 55 and be coupled to a first coupler 13a formed at one end of the second stabilizer bar 13.

In one embodiment of the present invention, the connection member 55 may be formed to surround an outer circumferential surface of the second stabilizer bar 13.

Meanwhile, in one embodiment of the present invention, the first coupler 13a and the first corresponding coupler 55a may be shaped as mating splines, whereby the first coupler 13a may be coupled to the first corresponding coupler 55a of the connection member 55 such that at least a portion of the second stabilizer bar 13 may be fixed inside the connection member 55.

At this point, the first corresponding coupler 55a may be formed in a female thread shape at the inner circumferential surface of the connection member 55, but is not limited thereto as long as the first coupler 13a and the first corresponding coupler 55a can be screw-coupled.

Referring to FIGS. 2 and 3, in one embodiment of the present invention, the second stabilizer bar 13 may be coupled to one side of the carrier 51, i.e., to the connection member 55, and the coupler 59 and the damper 67 may be positioned at the other side of the carrier 51, i.e., at the coupling recess 53a of the carrier body 53.

Meanwhile, referring to FIG. 3, the coupler 59 is disposed on an extension line of the rotational shaft of the motor 30 to be spaced apart from the rear side of the motor 30 such that the second stabilizer bar 13 may be distorted to absorb vibrations caused by torsion generated when the rotational forces generated from the motor 30 and the planetary gear 40 are supplied to the first stabilizer bar 11.

In one embodiment of the present invention, the coupler 59 may include a coupler body 61 and a protrusion 63 and may be coupled to the carrier 51 and supported on an inner surface of the housing 21. At this point, the protrusion 63 may be insertion-coupled to the coupling recess 53a of the carrier 51 together with the damper 67.

In one embodiment of the present invention, the coupler 59 transmits the rotational forces generated through the motor 30 and the first stabilizer bar 11 to the second stabilizer bar 13 via the damper 67 and the carrier 51.

Referring to FIG. 3, in one embodiment of the present invention, the coupler body 61 may be in a disk shape and be rotatably coupled to the inner surface of the housing 21. As shown in FIG. 3, the protrusion 63 may be formed to extend rearward from one surface of the coupler body 61, e.g., from a central portion of the coupler body 61.

Further, in one embodiment of the present invention, a mounting hole 65 may be formed in the central portion of the coupler body 61 and a central portion of the protrusion 63. At this point, the coupling recess 53a of the carrier body 53, the coupler body 61, and the mounting hole 65 of the protrusion 63 may serve as a withdrawal hole (not shown) through which a wire is withdrawn to be electrically connected to the torque measurement sensing part 70.

Alternatively, the mounting hole 65 may be used as a space in which the torque measurement sensing part 70 is mounted. That is, according to another embodiment of the present invention, the torque measurement sensing part 70 may be mounted on the coupler 59 instead of the carrier 51.

As described above, according to the present invention, the torque measurement sensing part 70 is mounted in the accommodation part 53b of the carrier body 53 or the mounting hole 65 of the coupler 59 to accurately measure the torques generated at the pair of stabilizer bars 10, such that the active roll stabilizer 1 may prevent a rotation over a predetermined rotational angle and achieve stability of the vehicle by controlling the roll moment in the turning section and the rotating section of the vehicle.

Referring to FIGS. 3 and 4, in one embodiment of the present invention, the torque measurement sensing part 70 may include a sensor support member 71, a torque measurement sensor 85, and a printed circuit board 83. At this point, the torque measurement sensing part 70 may be positioned on the extension line of the rotational shaft of the motor 30 and be fixed inside the carrier 51, thereby measuring the torque generated at any one of the pair of stabilizer bars 10.

Referring to FIG. 4, the sensor support member 71 may be formed in a cylindrical shape at which a through-hole 71a is formed in an extension direction of the sensor support member 71 at a central portion thereof and be coaxially disposed on the extension line of the rotational shaft of the motor 30.

Meanwhile, in one embodiment of the present invention, the sensor support member 71 may include an installation part 73, a first torque transfer part 75, and a second torque transfer part 77. At this point, the installation part 73 may be a sensor mounting part on which the torque measurement sensing part 70 is mounted, and the first torque transfer part 75 and the second torque transfer part 77 may be sensor fixing parts.

Referring to FIG. 4, in one embodiment of the present invention, the first torque transfer part 75 and the second torque transfer part 77 may be connected to both ends of the installation part 73. In one embodiment of the present invention, the installation part 73, the first torque transfer part 75, and the second torque transfer part 77 may be formed in cylindrical shapes.

In one embodiment of the present invention, the installation part 73, the first torque transfer part 75, and the second torque transfer part 77 may be formed to have different rigidities. That is, the rigidity of the installation part 73 may be greater than that of each of the first torque transfer part 75 and the second torque transfer part 77.

Referring to FIG. 4, in one embodiment of the present invention, a cross-sectional area of the installation part 73 may be greater than that of each of the first torque transfer part 75 and the second torque transfer part 77. That is, a diameter of the installation part 73 is larger than that of each of the first torque transfer part 75 and the second torque transfer part 77 such that the rigidity of the installation part 73 may be greater than that of each of the first torque transfer part 75 and the second torque transfer part 77.

In one embodiment of the present invention, since the rigidity of the installation part 73 is larger than that of each of the first torque transfer part 75 and the second torque transfer part 77, even though an external torque is applied to the installation part 73, torsion of the installation part 73 becomes smaller such that an amount of torque being transmitted may be reduced.

In one embodiment of the present invention, the installation part 73, the first torque transfer part 75, and the second torque transfer part 77 may be separately combined, but the present invention is not limited thereto and the installation part 73, the first torque transfer part 75, and the second torque transfer part 77 may also be integrally formed.

Meanwhile, in one embodiment of the present invention, the installation part 73 may be processed such that the torque measurement sensor 85 and the printed circuit board 83 may be installed adjacent to each other on at least a portion of an outer circumferential surface of the installation part 73. At this point, at least the portion of the installation part 73 may be formed to have a flat surface or formed as a recess having a flat surface therein, but is not limited thereto.

Referring to FIG. 4, the torque measurement sensor 85 may be parallel to the printed circuit board 83 to be spaced apart from the printed circuit board 83 in the forward direction. In one embodiment of the present invention, the torque measurement sensor 85 may be a strain gauge. The strain gauge may detect torsional moments of the pair of stabilizer bars 10 and output the detected torsional moments as an electrical signal.

Since the strain gauge which is the torque measurement sensor 85 is installed inside the carrier 51, the active roll stabilizer 1 according to one embodiment of the present invention may increase durability and reliability of the strain gauge.

Meanwhile, the printed circuit board 83 may be installed on the sensor support member 71 to be parallel to the torque measurement sensor 85, and a control circuit (not shown) may be provided at the printed circuit board 83 to amplify the electrical signal for the torsional moments of the pair of stabilizer bars 10, which are measured by the torque measurement sensor 85, within a predetermined range.

The active roll stabilizer 1 according to one embodiment of the present invention may be configured such that the strain gage which is the torque measurement sensor 85 and the printed circuit board 83 are disposed in parallel to each other so that the torque measurement sensing part 70 may be modularized, and the torque may be easily corrected using the printed circuit board 83.

Meanwhile, the printed circuit board 83 may be connected to an electronic control unit (ECU) via a cable. In one embodiment of the present invention, the ECU may calculate a torque for compensating for the roll angle of the vehicle, which is suitable for a situation of the vehicle, on the basis of the torque measured by the torque measurement sensing part 70 and operate the pair of stabilizer bars 10 through the actuator 20 on the basis of the calculated torque, thereby reducing the roll moment of the vehicle and improving ride comfort.

That is, the actuator 20 is rotated against left and right pulls of the vehicle due to a centrifugal force while the vehicle is turning to generate a torsion force corresponding to the centrifugal force such that a posture of the vehicle is actively compensated similar to the posture thereof in a normal straight driving state through the pair of stabilizer bars 10.

Meanwhile, the ECU acquires all pieces of information gathered therein regarding the driving of the vehicle and transmits an operation command on the basis of the gathered information.

Referring to FIG. 4, a first seating member 79 of a cylindrical shape may be formed at one end of the sensor support member 71, e.g., a front portion of the second torque transfer part 77, and a second seating member 81 of a cylindrical shape may be formed at the other end of the sensor support member 71, e.g., a rear portion of the first torque transfer part 75.

In one embodiment of the present invention, outer circumferential surfaces of the first seating member 79 and the second seating member 81 are formed to correspond to the accommodation part 53b formed inside the carrier body 53 such that the sensor support member 71 may be fixed to the accommodation part 53b. At this point, the first seating member 79 and the second seating member 81 may be formed in the same shape but are not limited thereto.

Referring to FIGS. 3 and 4, the first seating member 79 may be in contact with a rear portion of the accommodation part 53b, i.e., a front end of the hook bump member 54, and the second seating member 81 may be in contact with a front portion of the accommodation part 53b. At this point, an insertion recess 81a is formed to radially extend into the second seating member 81 such that the sensor support member 71 may be easily press-inserted into or pulled from the accommodation part 53b.

Meanwhile, in one embodiment of the present invention, the sensor support member 71, the first seating member 79, and the second seating member 81 may be separately combined, but the present invention is not limited thereto and the sensor support member 71, the first seating member 79, and the second seating member 81 may also be integrally formed.

The active roll stabilizer according to one embodiment of the present invention may limit an amount of torsion of a torque measurement sensor configured to directly measure a torque when a rotational force is generated. That is, even though an external torque is applied, torsion of the installation part 73 may be reduced such that the amount of torque being transmitted may be reduced.

In one embodiment of the present invention, the motor 30 and the torque measurement sensing part 70 are installed inside the housing 21, and various devices for operating the electronic active roll stabilizer may be installed between the motor 30 and the torque measurement sensing part 70.

The devices are known devices for the electronic actuator stabilizer, and thus a description thereof will be omitted.

The active roll stabilizer according to the embodiments of the present invention can achieve stability of a vehicle by measuring torques of a pair of stabilizer bars connected to wheels and controlling a roll moment.

A torque measurement sensing part is mounted inside a carrier such that the active roll stabilizer according to the embodiments of the present invention can measure the torques without slippage generated at a coupler and nonlinearity of a damper.

A small torque measurement sensing part is mounted inside the carrier and thus an actual torque applied becomes very small such that the active roll stabilizer according to the embodiments of the present invention can be installed using a separate bolt or the like.

The torque measurement sensing part is press-inserted into the carrier to accurately measure the torques generated at the pair of stabilizer bars such that the active roll stabilizer according to the embodiments of the present invention can prevent a rotation over a predetermined rotational angle and achieve stability of the vehicle by controlling a roll moment in a turning section and a rotating section of the vehicle.

A strain gauge which is a torque measuring sensor is installed inside the carrier such that the active roll stabilizer according to the embodiments of the present invention can enhance durability and reliability of the strain gauge.

The active roll stabilizer according to the embodiments of the present invention can be configured such that the strain gauge which is a torque measurement sensor and a printed circuit board are disposed in parallel to each other so that the torque measurement sensing part can be modularized, and a torque may be easily corrected using the printed circuit board.

An installation part on which the strain gauge is mounted, and a torque transfer part have different rigidities and diameters such that the active roll stabilizer according to the embodiments of the present invention can reduce a torque transmitted to the strain gauge to prevent a sensible range of the strain gauge from being out of a sensing range.

Meanwhile, the active roll stabilizer according to the embodiments of the present invention can remove inconvenience of installing a separate sensor configured to measure the torques generated at the pair of stabilizer bars, reduce installation costs, and easily measure the torques.

Hereinbefore, although the embodiments of the present invention have been described, the spirit of the present invention is not limited to the embodiments disclosed herein, and it should be understood that numerous other embodiments can be devised by those skilled in the art that will fall within the same spirit and scope of the present invention through addition, modification, deletion, supplement, and the like of a component, and also these other embodiments will fall within the spirit and scope of the present invention.

What is claimed is:

1. An active roll stabilizer comprising:
a pair of stabilizer bars installed between left and right wheels of a vehicle; and
an actuator which connects the pair of stabilizer bars and transmits a rotational force to the pair of stabilizer bars,
wherein the actuator includes:
a motor configured to generate the rotational force;
a housing coupled to a portion between the pair of stabilizer bars and having the motor disposed inside the housing;
a damping part disposed on an extension line of a rotational shaft of the motor inside the housing and configured to absorb vibrations generated at the motor and the pair of stabilizer bars; and
a torque measurement sensing part configured to measure a torque transmitted by the rotational force inside the damping part,
wherein the damping part includes:
a coupler disposed on the extension line of the rotational shaft of the motor inside the housing and having one side supporting an inner surface of the housing; and
a carrier having one side coupled to the other side of the coupler, the other side coupled to one of the pair of stabilizer bars, and an accommodation part formed at a central portion of the carrier, wherein the accommodation part is an accommodation space in which the torque measurement sensing part is mounted.

2. The active roll stabilizer of claim 1, wherein the carrier includes:
a carrier body formed in a cylindrical shape, and having one side provided with a coupling recess to which the other side of the coupler is coupled and the other side provided with the accommodation part in which the torque measurement sensing part is installed; and
a connection member formed to protrude from the other side of the carrier body and coupled to at least one of the pair of stabilizer bars.

3. The active roll stabilizer of claim 2, wherein the damping part is disposed between the carrier and the coupler, and includes a damper coupled to the coupler to cover a portion of an outer surface of the coupler and configured to absorb vibrations generated at the motor and the pair of stabilizer bars.

4. The active roll stabilizer of claim 1, wherein the carrier and the coupler have central portions provided with a withdrawal hole through which a wire is withdrawn to be electrically connected to the torque measurement sensing part.

5. The active roll stabilizer of claim 1, wherein:
the torque measurement sensing part includes a sensor support member coaxially disposed on the extension line of the rotational shaft of the motor, and a torque measurement sensor installed on an outer circumferential surface of the sensor support member; and
the sensor support member includes a sensor mounting part on which the torque measurement sensor is mounted, and a sensor fixing part formed at both ends of the sensor mounting part and having rigidity which is less than that of the sensor mounting part.

6. The active roll stabilizer of claim 5, wherein a thickness of the sensor fixing part is smaller than that of the sensor support member.

7. The active roll stabilizer of claim 5, wherein a printed circuit board and the torque measurement sensor are installed on an outer surface of the sensor mounting part.

8. The active roll stabilizer of claim 7, wherein the outer surface of the sensor mounting part is provided with a flat surface or provided as a recess having a flat surface therein to allow the torque measurement sensor and the printed circuit board to be installed on the flat surface.

9. An active roll stabilizer comprising:
a pair of stabilizer bars installed between left and right wheels of a vehicle; and
an actuator which connects the pair of stabilizer bars and transmits a rotational force to the pair of stabilizer bars,
wherein the actuator includes:
a motor configured to generate the rotational force;
a housing coupled to a portion between the pair of stabilizer bars and having the motor disposed inside the housing;
a damping part disposed on an extension line of a rotational shaft of the motor inside the housing and configured to absorb vibrations generated at the motor and the pair of stabilizer bars; and
a torque measurement sensing part configured to measure a torque transmitted by the rotational force inside the damping part,
wherein the damping part includes:
a coupler disposed on the extension line of the rotational shaft of the motor inside the housing, having one side supporting an inner surface of the housing, and having the torque measurement sensing part mounted inside the coupler; and
a carrier having one side coupled to the other side of the coupler and the other side coupled to any one of the pair of stabilizer bars.

* * * * *